Figure 1:
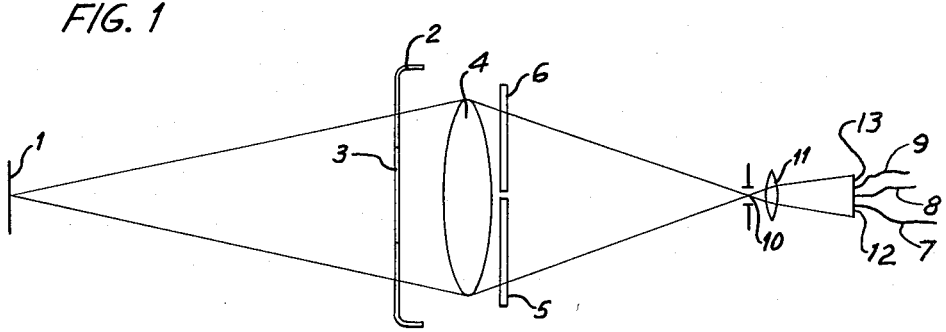

June 16, 1964    R. W. ASTHEIMER    3,137,170
INFRARED TELETHERMOMETER
Filed June 23, 1960    2 Sheets-Sheet 1

INVENTOR.
ROBERT W. ASTHEIMER
BY
ATTORNEY

June 16, 1964  R. W. ASTHEIMER  3,137,170
INFRARED TELETHERMOMETER

Filed June 23, 1960  2 Sheets-Sheet 2

INVENTOR.
ROBERT W. ASTHEIMER

BY
*Robert Kims Shirley*

ATTORNEY

3,137,170
INFRARED TELETHERMOMETER

Robert W. Astheimer, Westport, Conn., assignor to Barnes Engineering Company, Stamford, Conn., a corporation of Delaware
Filed June 23, 1960, Ser. No. 38,299
8 Claims. (Cl. 73—355)

The invention relates to a telethermometer and particularly to a thermometer capable of measuring the surface temperature of distant objects by means of their infrared radiation and, more particularly, measuring changes about a predetermined temperature.

The measurement of temperature of objects at a distance presents a very serious problem if accurate results are required. At first glance it would appear a simple matter to measure the infrared radiation from a distant object and to compute therefrom the temperature. This attempted solution, however, immediately involves a number of difficulties. First it is necessary to know accurately the emissivity and this is by no means a simple matter. A second problem is attenuation by absorption in passage through the air. This requires accurate knowledge of the exact distance of the object and introduces further complication in computation. A third problem lies in the fact that it is very difficult to maintain calibration of an instrument which is measuring total infrared radiation. A final problem is presented by cost, complexity and weight of the instruments used. The problem in the laboratory is not insurmountable where weight is no consideration and where elaborate instruments can be kept under conditions which are quite impossible in the field. There is therefore still a great demand for a simple, economical and rugged instrument of high accuracy which is portable and can be used in the field.

The present invention operates by detecting infrared energy from one fairly narrow band of infrared radiation and from another band which may be narrow or wide and which may or may not include the narrow band above referred to. Detection is by means of a differential infrared detector. If only one narrow band is used, preferably one where there is high radiation at the temperature where the measurement is desired, the other band can be a window which passes radiation including the first band and a good deal on either or both sides of it. There will be a much greater total energy through the broad band window, but for any particular temperature the radiation through the window can be attenuated by optical or electrical means, which will be described below, so that at a predetermined temperature the response of the differential detector will be zero. This simple arrangement which involves only one filter passing a narrow band is useful for many temperature measurements. It has disadvantages where the window includes infrared radiation in a region where there can be strong absorption bands. In such cases a change in the composition of the atmosphere between the instrument of the present invention and the object, the temperature of which is to be measured, may give a false reading and this simplified instrument is useful only where such changes are not likely to be encountered.

Much greater precision is possible if there are two narrow bands of infrared radiation preferably adjacent to each other. In this case, as will be brought out below, the temperature measurement is substantially unaffected by environment changes and where maximum accuracy is required the two filter or two narrow band modification will be used. It will be described first to illustrate the operation of the invention. It is theoretically possible by precise control of filter transmission to obtain equal energy in each band for a particular temperature. In practice it is impractical to obtain exact energy balance by filters alone. Other fine adjusting means are normally used as will be described below. Shift of temperature will result in one or the other wavelength band receiving more energy. With a differential detector, there will be complete cancellation and no signal only at the temperature where there is equal energy from the two wavelength bands. If the bands are not too wide no problem is presented either by nonuniform emissivity of the body or, if the two bands are chosen where there is no serious atmospheric absorption, by attenuation in passage through the atmosphere which changes the response with path length.

From the above description of the preferred two filter modification it would appear that this instrument can be used for measuring temperature on either side of one predetermined temperature for any one pair of filters which determine the bands, and hence that it would be necessary to use a different pair of filters for each predetermined temperature. In a more preferred modification of the present invention, however, a reasonable latitude is presented by varying the relative amount of radiation cross section going through each of the filters. In this way a considerable range of temperatures, either side of the temperature corresponding to a radiation peak, can be effectively measured.

Since the operation of instruments of the present invention in their two filter embodiment is not particularly changed by emissivity, calibration for different temperatures can be easily obtained from calibrated black body radiators. This is a great added convenience and permits accurate calibration in the field using readily available standard equipment.

In the present invention there need not be any moving parts, at least in the optics portion of the instruments, which reduces weight, complexity and cost and makes for a rugged, reliable instrument.

The instruments, both one and two filter, will be described in detail in conjunction with the drawings primarily for use with infrared radiations. These radiations are by far the most practical for use in a wide range of temperature measurements. However, when temperature measurements of very hot objects are involved, it is possible to utilize radiations within the visible spectrum. Such occasions are rare but in its broadest aspect the present invention involves the use of any optical radiations; that is to say, radiations of wavelengths sufficiently short to obey accurately optical laws.

Figure 2:
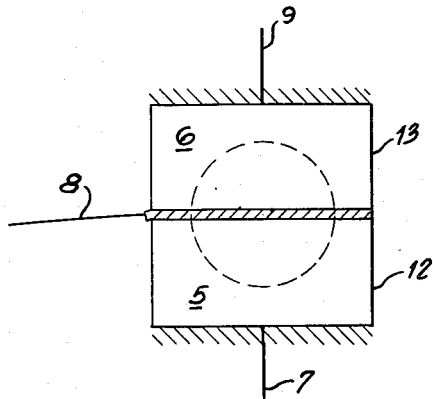
Figure 3:
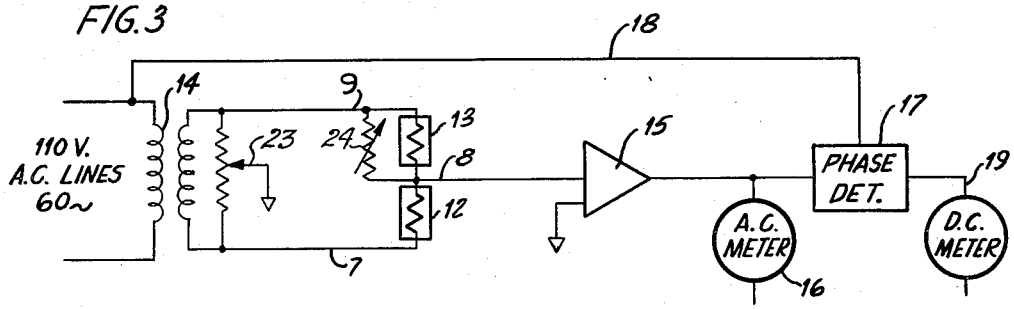
Figure 4:
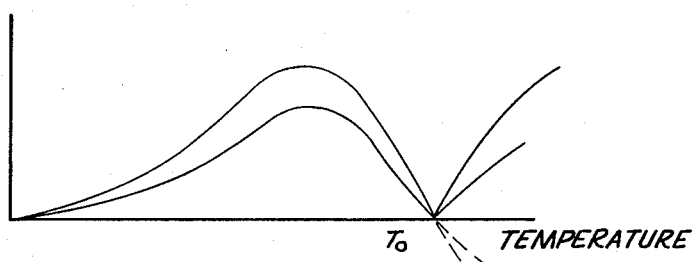
Figure 5:
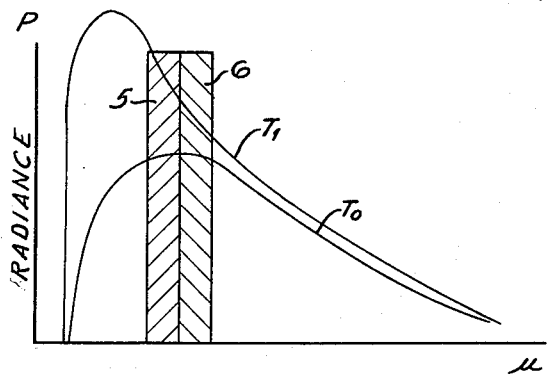
Figure 6:
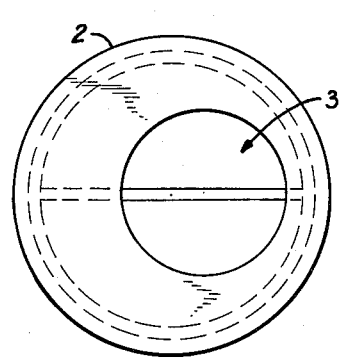
Figure 7:
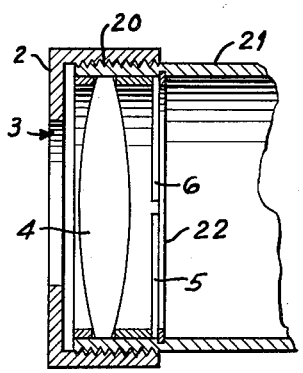

The invention will be described in greater detail in conjunction with the drawings in which:

FIG. 1 is a diagrammatic showing of the optical path;
FIG. 2 is an elevation of a differential infrared detector;
FIG. 3 is a block diagram of suitable electronic circuits;
FIG. 4 is a graph of signal outputs for different temperatures;
FIG. 5 is a radiation distribution graph for two temperatures showing a pair of filters;
FIG. 6 is a front elevation of the instrument objective;
FIG. 7 is a section along line 7—7 of FIG. 6;

Referring to FIG. 1, the object, the temperature of which is to be measured, is shown at 1 with the rays striking the front of an instrument of the present invention provided with a movable cap 2, (see particularly FIGS. 6 and 7), with its aperture 3 eccentrically located but shown centered with respect to the filters. After passing through the aperture 3 the rays from the object are imaged by the lens 4 onto a field stop 10. In the path they pass through two filters 5 and 6 each passing narrow adjacent bands of radiation; for example, in the infrared. Just beyond the field stop 10 is a field lens 11 which images the aperture stop 3 on a differential infrared detector, for example, a differential lead sulfide detector, having two portions 12 and 13 and three leads 7, 8 and 9. The image is shown in a dashed circle in FIG. 2 and since the aperture opening 3 is in its centered position, it will be noted that an equal cross section of the beam passing through each filter is imaged on each of the two parts of the detector. In FIG. 1, which is diagrammatic, the spacing of the cap 2, lens 4 and filters 5 and 6 has been exaggerated. In practice these elements are very close together so that the important function of the field lens of imaging these elements onto the detector plane can be achieved. The function of the field lens is of great importance as it results in uniform distribution on the detector of radiation from any point on the object.

FIG. 3 is an electronic block diagram. The two infrared detectors 12 and 13 are shown as connected in series to the secondary of transformer 14 the primary of which goes to the 110 volt, 60 cycle, A.C. lines. The secondary of the transformer is adjustably center tapped to ground through potentiometer 23. In the case illustrated in FIGS. 1 and 2 the electrical output of the two detectors is proportional to the relative amounts of radiation in the bands of the two filters. A differential output from the two detectors is introduced into the input of an amplifier 15 which input is also grounded. Another way of looking at the circuit is that the input to the amplifier 15 is connected across a Wheatstone bridge formed of the two parts of the secondary of the transformer 14 and the two detectors 12 and 13. The output of the amplifier 15 is measured by an A.C. meter 16 and also is introduced into a phase detector 17 which receives one phase from the primary of the transformer 14 through the conductor 18. The output of the phase detector can then be measured by a D.C. meter 19 or the signal may otherwise be utilized in a conventional manner. Where a greater adjustment of the instrument is needed it is possible to vary the bias on one thermistor and this is shown by a rheostat 24. The use of additional electrical controls will be described below in conjunction with a single filter instrument.

FIG. 4 shows A.C. signals from bodies of different emissivity. It will be seen that at a given temperature, $T_0$, the signal is zero. A similar situation is shown in FIG. 5 but here the curves are for different temperatures, $T_0$ and $T_1$. It will be seen that the peak of the curve for $T_0$ is at the junction between the bands of the two filters 5 and 6. Therefore, the amount of energy or rather intensity of radiation is uniform through each filter. In the case of a higher temperature, $T_1$, however, there will be more energy in the region of filter 5 than in the region of filter 6. FIG. 4 shows the A.C. signal as changing phase beyond the temperature $T_0$, the opposite phase being shown in dashed lines. In other words, as the temperature approaches $T_0$ the A.C. signal approaches zero and then increases again. However, when phase detected the situation is shown by solid lines instead of the dashed lines and therefore the D.C. meter 19, which will normally be of the zero center type, will show departure from zero reading at $T_1$ and will indicate the direction in which departure takes place.

For measuring $T_0$ and determining departures therefrom over a narrow range, nothing more is needed but if other temperatures become of interest, it would be necessary to introduce another pair of filters. This can be done if it is desirable to extend the range of a given pair of filters and this is effected by positioning the aperture 3 in cup 2 eccentrically so that rotation of this cap can vary the relative cross section of the beam passing through the two filters. FIG. 7 illustrates the mechanical design and shows a mounting tube 21 carrying all of the optics with a filter holder 22 and an external thread 20 on which the cap 2 can be turned.

Let us now assume that it is desired to measure a temperature a little higher than $T_0$. As has been pointed out above, there will be a greater intensity of radiation through the filter 5 than through the filter 6. This, however, can be compensated exactly by turning the cap 2 until the cross section of the beam going through filter 6 is enough larger than that going through filter 5 so that the output signal will be zero. Then temperatures either side of the new selected temperature will again be shown by the meter as is described above. In this manner the range of measurement is extended by the instrument for a given pair of filters. Calibration for the new temperature is simple as an ordinary black body, the temperature of which is accurately known, can be used. Since the bands are relatively narrow and are next to each other, there will normally be no significant difference with different emissivities as was mentioned in connection with the description of FIG. 4 above, and therefore the black body calibration will hold within the limits of accuracy that the instrument provides which are, however, much higher than anything hitherto available.

If the temperature which is to correspond to a zero signal is still further removed from the original $T_0$ it may be desired to use another pair of filters. These can be easily introduced into the filter holders 22 and the instrument used in the new range.

The description of the instrument in terms of two filters has been mainly in connection with narrow band filters the response of which is shown in FIG. 5. It is not necessary that both filters be narrow band. It is sufficient if one is. The other may be a very broad band filter which may even pass radiation in the selected band. This filter may be considered more in the nature of a window. For example, in the infrared a thin germanium sector will pass infrared from about $1.8\mu$ on. Although theoretically a window may be considered as a broad band filter the difference in transmission is so great that such an instrument may be loosely thought of as a single filter instrument.

The wide band of infrared passed by the window will contain very much more energy than will the portion going through the filter 6. However, the device can be calibrated by sufficient attenuation so that for a black body source at a temperature of $T_0$ the output of the electrical circuits will be zero. The attenuation is very great and may be a factor of as much as ten. A considerable part of the attenuation can be effected by turning the cap 2 in FIGS. 6 and 7 until only a very small cross section of the beam goes through the germanium window. This can be used as a coarse adjustment but since the attenuation is very great a vernier or a micrometer screw drive would be necessary to get an accurate null. A better way is to use the turning of the cap 2 as a coarse adjustment and then to provide a fine adjustment elsewhere in the instrument.

The fine adjustment can effectively be introduced in the electrical circuits. However, no single adjustment can be used to balance the bridge when radiation is uniform and still provide for an accurate reading off balance. Essentially this requires a variation both in the total bias applied to the two detectors and their relative responsivities. In the electrical circuit this requires separate adjustments and these are effected both by the center tap control of potentiometer 23 and a rheostat 24 which shunts the detector 13. It is possible to effect all of the compensation for different temperatures in the electrical circuits but as the two electrical controls interact to some extent this requires a number of manipulations before a good balance is obtained. Therefore it is preferable to use the optical adjustment as a coarse one. Where two narrow band filters are used the optical adjustment is sufficient without any electrical adjustment and in such cases the secondary of the transformer 14 can be provided with a fixed center tap and the potentiometer 23 and rheostat 24 eliminated.

If there is an adjustment so that for a temperature $T_0$ the instrument is nulled then if the temperature rises to $T_1$ the peak of radiation will be displaced to shorter wavelengths and there will be a higher reading from the detector receiving radiation through the germanium window. The operation is, therefore, similar to that described in conjunction with the preferred modification where two filters are used. The instrument is not as sensitive and as has been pointed out above there is not the same insensitiveness to changes in environment as with the preferred two filter embodiment. For example, if there were suddenly an increase in water vapor in the path to the object to be measured this would create a sharp absorption in a portion of the infrared which is received by detector 12 and so could be interpreted as a spurious temperature indication.

It will be apparent that except for instruments which do not require the maximum of precision the two filter embodiment presents many advantages and few, if any, drawbacks except where great ranges of temperatures are to be measured in a short space of time. Ordinarily the range of temperatures to be measured is not very great and so one or at most a very small number of filter pairs will be used. Generally this range will be such that the same detector pair is still useful. However, the instruments of the present invention can be used with more than one pair of detectors; for example, in the relatively rare instances where detectors in the visible range are desirable they can be introduced. With most objects, however, it will be found that the use of wavelength bands in the infrared are most suitable and so, of course, infrared detectors will prove to be more satisfactory. It should be noted that in the rare instances where an instrument is designed for use in the visible range, a much greater sensitivity of detectors in this range renders amplification less necessary. Also, it is possible to use split photovoltaic detectors of the barrier layer type, in which case a reliable D.C. output can be obtained without any amplification. In the infrared, however, which is the field of greatest utility for the present invention, the sensitivity of the detectors is much lower and ordinarily amplification is desirable.

In the drawings a cap with an eccentric opening has been illustrated as the means for varying the relative cross sections of the beams in the two bands or regions of radiation. This is an economical and practical design but the invention is not in any way limited thereto and any device which is capable of varying the relative cross sections of the beams may be used. An example of one of the many other types of controls is a micrometric obscurating means for one of the beams.

The embodiments of the invention illustrated in the drawing have no moving parts and so present a maximum of ruggedness, reliability with a minimum of weight and cost. This is made possible in the case of infrared instruments by using alternating current on the detectors which permits the accuracy of A.C. amplifiers. While less desirable from cost, weight and other considerations the invention includes also in its broadest aspect chopped radiation in which case D.C. bias is used on the detectors and the chopper must put out a reference signal to actuate the phase detector 17. Such chopping and phase detection is conventional in many infrared instruments.

I claim:
1. A device for measuring the radiations of a distant object resulting from the object's temperature comprising in combination and optical alignment,
   (a) an optical system having an entrance pupil and an objective,
   (b) filtering means passing at least one narrow band of optical radiation and another band,
   (c) a pair of radiation detectors connected in a bridge circuit and detecting radiation by change in resistance, said detectors lying side by side and in the same plane,
   (d) means for imaging the entrance pupil uniformly on the two detectors to produce images greatly reduced in size from the dimensions of the entrance pupil,
   (e) the filtering means being located with respect to the detectors and the means for imaging the entrance pupil thereon so that radiation passing through each filtering means strikes only one detector, and
   (f) means for varying the output signal from at least one of the detectors through a range sufficient to produce a zero total output signal from radiations of an object at a predetermined temperature.

2. A device according to claim 1 in which the means for varying the output signal decreases the output signal from one of the detectors and at the same time correspondingly increases the signal from the other detector whereby variation of the output signal does not substantially decrease total differential output signal.

3. A device according to claim 2 in which the detectors are infrared radiation detectors.

4. A device according to claim 1 in which the detectors are infrared radiation detectors.

5. A device according to claim 4 in which the means for varying the output signal of one of the detectors comprises both optical means for varying beam cross section on the detector and electrical attenuating means connected thereto.

6. An instrument according to claim 1 in which the radiation detectors are connected in series to an A.C. biasing voltage and an A.C. amplifier is provided the input of which is connected to the junction of the detectors.

7. An instrument according to claim 6 in which a phase detector is connected to the output of the A.C. amplifier and to the A.C. biasing voltage whereby a D.C. voltage is produced by the phase detector.

8. An instrument according to claim 7 in which the means for moving the entrance aperture comprises a plate rotatable about the optic axis of the objective and provided with an eccentrically located opening.

References Cited in the file of this patent
UNITED STATES PATENTS

| | | |
|---|---|---|
| 2,302,554 | Kingsbury | Nov. 17, 1942 |
| 2,431,540 | Salinger | Nov. 25, 1947 |
| 2,785,860 | Harrison et al. | Mar. 19, 1957 |
| 2,800,023 | Obermaier | July 23, 1957 |
| 2,927,502 | Watrous | Mar. 8, 1960 |